US012622371B2

(12) United States Patent　　　　(10) Patent No.:　　US 12,622,371 B2

Bussell　　　　　　　　　　　　　　(45) Date of Patent:　　　May 12, 2026

(54) OPEN AQUATIC ALGAE CULTIVATION SYSTEM WITH SEMIPERMEABLE LINER SECTIONS FOR IMPROVED ENVIRONMENTAL UPTAKE OF CARBON DIOXIDE

(71) Applicant: Stuart Bussell, Carlsbad, CA (US)

(72) Inventor: Stuart Bussell, Carlsbad, CA (US)

( * ) Notice: Subject to any disclaimer, the term of this patent is extended or adjusted under 35 U.S.C. 154(b) by 2 days.

(21) Appl. No.: 18/709,888

(22) PCT Filed: Nov. 21, 2022

(86) PCT No.: PCT/US2022/080212

§ 371 (c)(1),
(2) Date: May 14, 2024

(87) PCT Pub. No.: WO2023/092114

PCT Pub. Date: May 25, 2023

(65) Prior Publication Data

US 2025/0008901 A1　　　Jan. 9, 2025

Related U.S. Application Data

(60) Provisional application No. 63/281,941, filed on Nov. 22, 2021.

(51) Int. Cl.
A01G 33/00　　　　　(2006.01)
(52) U.S. Cl.
CPC .................................... A01G 33/00 (2013.01)
(58) Field of Classification Search
CPC ..................................................... A01G 33/00
See application file for complete search history.

(56) References Cited

U.S. PATENT DOCUMENTS 3,402,506 A * 9/1968 Renfro ................... C12M 23/48
　　　　　　　　　　　　　　　　　　　119/223
3,955,317 A * 5/1976 Gudin .................... C12M 23/26
　　　　　　　　　　　　　　　　　　　47/60
4,487,588 A * 12/1984 Lewis, III ............. A01G 31/02
　　　　　　　　　　　　　　　　　　　47/65

(Continued)

OTHER PUBLICATIONS

Chen, Yi-Bu, Jonathan P. Zehr, and Mark Mellon. 1996. "Growth and Nitrogen Fixation of the Diazotrophic Filamentous Nonheterocystous Cyanobacterium Trichodesmium Sp. Ims 101 in Defined Media: Evidence for a Circadian Rhythm1." Journal of Phycology 32 (6): 916-23. https://doi.org/10.1111/j.0022-3646.1996. 00916.x.

(Continued)

*Primary Examiner* — Michael H Wang
(74) *Attorney, Agent, or Firm* — James G Passe; Passe Intellectual Property

(57)　　　　　　ABSTRACT

An open aquatic algae cultivation system (OAACS) with an algae impermeable liner that includes semipermeable liner sections for improved environmental uptake of carbon dioxide is disclosed. OAACS comprises a buoyant framework, an algae impermeable liner with a structure largely impermeable to the cultivated algae culture but with semipermeable liner sections permeable to dissolved inorganic carbon, a culture, and a mooring system. Practical semipermeable liner sections are also disclosed.

25 Claims, 3 Drawing Sheets

(56)              References Cited

U.S. PATENT DOCUMENTS

| | | | | |
|---|---|---|---|---|
| 5,309,672 | A * | 5/1994 | Spencer | A01G 33/00 |
| | | | | 405/23 |
| 5,329,719 | A * | 7/1994 | Holyoak | A01K 61/60 |
| | | | | 43/6.5 |
| 5,528,856 | A * | 6/1996 | Smith | C02F 3/327 |
| | | | | 47/1.4 |
| 6,854,408 | B2 | 2/2005 | Baan | |
| 10,633,628 | B1 * | 4/2020 | Yeh | C12M 41/48 |
| 11,632,919 | B2 * | 4/2023 | Bussell | C12M 23/18 |
| | | | | 47/1.4 |
| 2010/0216203 | A1 * | 8/2010 | Trent | C12M 23/14 |
| | | | | 435/166 |
| 2010/0287829 | A1 * | 11/2010 | Bussell | C12M 23/18 |
| | | | | 47/1.4 |
| 2015/0275161 | A1 * | 10/2015 | Gressel | C12M 23/06 |
| | | | | 435/257.1 |
| 2016/0075981 | A1 * | 3/2016 | Lee | C12M 31/00 |
| | | | | 435/257.1 |
| 2023/0101427 | A1 * | 3/2023 | Wakefield | C12M 33/20 |
| | | | | 435/292.1 |

OTHER PUBLICATIONS

Garbe, Christoph S., Anna Rutgersson, Jacqueline Boutin, Gerrit de Leeuw, Bruno Delille, Christopher W. Fairall, Nicolas Gruber, et al. 2014. "Transfer Across the Air-Sea Interface." In Ocean-Atmosphere Interactions of Gases and Particles, edited by Peter S. Liss and Martin T. Johnson, 55-112. Springer Earth System Sciences. Berlin, Heidelberg: Springer Berlin Heidelberg. https://doi.org/10.1007/978-3-642-25643-1_2.

Grosenbaugh, Mark A. 1995. "Designing Oceanographic Surface Moorings to Withstand Fatigue." Journal of Atmospheric and Oceanic Technology 12 (5): 1101-10. https://doi.org/10.1175/1520-0426(1995)012<1101:DOSMTW>2.0.CO;2.

Grosenbaugh. 1996. "On the Dynamics of Oceanographic Surface Moorings." Ocean Engineering 23 (1): 7-25. https://doi.org/10.1016/0029-8018(95)00019-H.

Heussler, Peter, J Castillo, S Merino, and V Vasquez. 1978. "Improvements in Pond Construction and CO2 Supply for the Mass Production of Microalgae." Arch. Hydrobiol. 11: 254-58.

Kenry, and Chwee Teck Lim. 2017. "Nanofiber Technology: Current Status and Emerging Developments." Progress in Polymer Science 70 (July): 1-17. https://doi.org/10.1016/j.progpolymsci.2017.03.002.

Mahamid, Mustafa, Edwin H. Gaylord, and Charles N. Gaylord, eds. 2020. Structural Engineering Handbook. Fifth edition. New York: McGraw-Hill.

Ponting, Michael, Tiffani M. Burt, LaShanda T. J. Korley, James Andrews, Anne Hiltner, and Eric Baer. 2010. "Gradient Multilayer Films by Forced Assembly Coextrusion." Industrial & Engineering Chemistry Research 49 (23): 12111-18. https://doi.org/10.1021/ie100321h.

Richmond, Amos, and Qiang Hu, eds. 2013. Handbook of Microalgal Culture: Applied Phycology and Biotechnology. Oxford, UK: John Wiley & Sons, Ltd. publisher—McGraw-Hill, ISBN #978-1-260-11598-7 https://doi.org/10.1002/9781118567166.

Tan, XueMei, and Denis Rodrigue. 2019. "A Review on Porous Polymeric Membrane Preparation. Part I: Production Techniques with Polysulfone and Poly (Vinylidene Fluoride)." Polymers 11 (7): 1160. https://doi.org/10.3390/polym11071160.

Wang, Jia, Deepak Langhe, Michael Ponting, Gary E. Wnek, LaShanda T. J. Korley, and Eric Baer. 2014. "Manufacturing of Polymer Continuous Nanofibers Using a Novel Co-Extrusion and Multiplication Technique." Polymer 55 (2): 673-85. https://doi.org/10.1016/j.polymer.2013.12.025.

* cited by examiner

OPEN AQUATIC ALGAE CULTIVATION SYSTEM WITH SEMIPERMEABLE LINER SECTIONS FOR IMPROVED ENVIRONMENTAL UPTAKE OF CARBON DIOXIDE

CROSS REFERENCE TO RELATED APPLICATIONS

This application claims priority to U.S. provisional application number U.S. 63/281,941, filed Nov. 22, 2021, naming Stuart Bussell as inventor.

FIELD OF THE DISCLOSURE

This disclosure relates most generally to a cultivation system, which is an algae cultivation system floating on the surface of a body of water. The disclosure also relates to the cultivation of algae using the algae cultivation system of the disclosure to grow an algae culture in a containment system, by exposing it to sunlight, wind, and waves.

BACKGROUND OF THE DISCLOSURE

Photosynthetic algae have long been recognized as a potential source of large amounts of biomass (Richmond and Hu 2013). Algae grow significantly faster than plants, offering the promise of more rapid conversion of $CO_2$ into useable organic materials. However, to date, algae have been unable to compete on a large scale with traditional plant-based agriculture for a number of reasons, including: 1) they normally require large amounts of costly water to cultivate, 2) the costs of installing and maintaining an algae pond can be cost prohibitive, 3) operational costs, including supplemental $CO_2$ supplies and energy for mixing to operate high productivity ponds, can be cost prohibitive, and 4) harvesting the algae from the ponds can be costly. Traditional large-scale algae cultivation also competes with traditional agriculture and other land uses for high insolation level land.

Once the algae are harvested, the costs of converting them to useable products are comparable to conventional crops and will depend upon the final desired products and the quality of the starting materials relative to them. If improvements to algae cultivation techniques are able to make the cultivation of algae more cost effective than conventional plant-based agricultural crops, large-scale generation of algal biomass can be used as a supplement or replacement for conventional products like food, agricultural feeds, and fuels.

Traditional systems to grow algae have been limited in scale and characterized by high installation and operating costs. They are categorized into three distinct groups, open systems, closed systems, and hybrid systems. The categorization is based on whether cultures are exposed to the surrounding environment. Open systems are exposed, closed systems are not, and hybrid systems attempt to combine the best qualities of the other two systems.

A typical open system is the raceway pond. It derives its name from its resemblance to a horse racetrack. Large raceway ponds generally encompass no more than 2-3 acres of growth area, because larger ponds are unable to effectively establish recirculation in the direction opposed to any prevailing winds. The pond depth is typically several feet deep, and the culture is usually circulated around the track by using a powered paddle wheel. The paddle wheel provides mixing to the pond. Expenses for nutrients, including $CO_2$ gas, water, and power are some of the major operating costs of an open system. Substantial fixed costs, like the installation of the pond and the cost of the land on which it sits, also contribute to making the costs of operating open systems prohibitive compared to conventional crop farms. Referring to the list of cost factors above, open systems are prone to all four and represent the base case for the following comparisons.

There are many types of closed systems that have been developed for the cultivation of algae in an attempt in improve the yields from these cultures and thus reduce costs. The logic behind these attempts is that by using a well-controlled system that is isolated from environmental contamination, high yielding species of algae can be cultivated without interference from others, and conditions for the culture can be optimized for highest yields. Comparing the cost factors of closed systems to racetrack type open systems, they suffer from the same ones, but the balance between them is shifted. Closed systems have the potential to save water because they suffer from less evaporation during cultivation. However, the evaporation in open systems provides a mechanism to cool the culture, and cost savings from using less water can easily be surpassed by more energy needed to cool the culture. Because closed systems are more highly engineered, installation and maintenance costs of closed systems tend to be much higher than those for racetrack type open systems. Finally, while yields tend to be higher for closed systems, the operational costs tend to be higher, mitigating, or even overwhelming, any potential benefits from the higher yields. Scale of operation for closed systems tend be smaller than open systems because of high associated infrastructure costs.

Hybrid systems attempt to mix the best qualities of open and closed systems in order to achieve economic competitiveness. Usually, small closed systems grow a preferred algae species which then seed a large open system. The higher fixed and operational costs of the closed system are kept to a minimum by keeping its relative size small, while the risk of environmental exposure of the open system is minimized by seeding it with sufficient amounts of algae from the closed system. The problem with large scale use of hybrid systems is that they don't address the basic four cost disadvantages of open and closed systems listed above relative to conventional farming; they merely minimize these costs between themselves. They fail to alter the basic cost advantages of conventional crop farms for the large-scale production of biomass over existing designs for algae ponds. While hybrid systems are capable of producing specialty products at the cheapest price, they have been unable to directly compete with conventional crop farms.

An open aquatic algae cultivation system (OAACS) has been designed that increases potential scales of operation and reduces many of the costs associated with traditional systems (Bussell 2010), the disclosure of which is hereby fully incorporated by reference herein. OAACS is especially conducive to large scale systems with individual unit surface areas equal to 1000 acres or more. Furthermore, because OAACS is located on bodies of water, it doesn't compete for level land with agriculture or any other use.

In this regard, OAACS provides for an aquatic algae cultivation system, or floating pond. Having an aquatic-based system essentially eliminates the cost of water and eliminates the cost of land. OAACS can be set up in an ocean or any other body of water large enough to contain it. Surrounding water is used to fill the system and, such as in the case of sea water, supplies many nutrients. Use of an aquatic floating cultivation system avoids competition with other uses for land. Furthermore, it avoids costs associated with terrestrial locations like site leveling.

In one aspect of OAACS, it provides an algae cultivation system floating on the surface of a body of water, the system comprising: a buoyant framework having at least one floating member; an algae impermeable liner attached to the buoyant framework such that the algae impermeable liner and the buoyant framework creates a containment structure for growing an algae culture, wherein the containment structure separates the culture from the body of water; an algae culture contained in the containment structure; and a mooring system, wherein the algae cultivation system is an open system, such that the algae culture growing in the containment structure is exposed to sunlight, wind and waves, characterized in that the buoyant framework comprises longitudinal members that are oriented so as to be aligned with the wind, in order to allow for maximal mixing and for a current of the culture to establish itself moving parallel to the longitudinal members, wherein the ratio of the width of the containment structure compared to the diameter of the longitudinal members is greater than one, being large enough for a representative current to be established.

In one embodiment, OAACS is constructed from low weight bearing components, e.g. piping and plastic algae impermeable liner. Because the system is suspended in water, it has the advantage that it can be constructed from low weight bearing components for the buoyant framework and less expensive components, e.g. plastic algae impermeable liner, to separate the system from surrounding water. Exposure of components to floating or submerged conditions limits the weight and stresses to which they are exposed, thereby enabling use of materials and geometries unsuitable for terrestrial installation. Use of tubes and piping for the buoyant framework of the floating system simplifies construction and scaling to large systems. In some embodiments, the system is submersible, thereby protecting it during violent surface conditions. This enables it to avoid the costs of constructing it to survive worst case conditions. In this way, installation and maintenance costs are kept to a minimum.

Therefore, in one embodiment of OAACS, the system is submersible, in order to provide some protection from violent surface conditions, and the system further comprises a submersion system for lowering the cultivation system below the surface of the body of water and which permits subsequent resurfacing of the system. In one such embodiment, the submersion system further comprises modulating the buoyancy of at least one buoyant framework member, wherein modulating the buoyancy of the at least one floating member may optionally comprise filling or partially filling the at least one floating member with at least a portion of the algae culture. Alternatively, the submersion system may comprise a winch system, wherein the winch system may optionally comprise a free hanging submerging line that extends to a subsurface. Additionally, the submersible algae cultivation system may further comprise a depth pressure sensor for controlling the depth of submersion of the algae cultivation system.

In another embodiment of OAACS, the buoyant framework is capable of submerging beneath the body of water, with the algae cultivation system further comprising a submersion system for lowering the algae cultivation system below the surface of the body of water and which permits subsequent resurfacing of the algae cultivation system, such that the algae cultivation system can be deployed to either: (i) float on the surface of the body of water, with the algae impermeable liner and buoyant framework creating a containment structure for growing an algae culture introduced into said containment structure, wherein the containment structure separates the algae culture from the body of water and the algae cultivation system is an open system, such that the algae culture growing in the containment structure is exposed to sunlight, wind and waves, or (ii) submerge below the surface of the body of water, in order to provide some protection from violent surface conditions. In one such embodiment, the submersion system further comprises modulating the buoyancy of at least one framework member, wherein modulating the buoyancy of the at least one floating member may optionally comprise filling or partially filling the at least one floating member with at least a portion of the algae culture. Alternatively, the submersion system may comprise a winch system, wherein the winch system may optionally comprise a free hanging submerging line that extends to a subsurface. Additionally, the algae cultivation system may further comprise a depth pressure sensor for controlling the depth of submersion of the algae cultivation system.

In some embodiments of OAACS, the overall system is constructed of low-cost repeating systems that can be coupled together to give a virtually unlimited size farm.

In one embodiment of OAACS at least two algae cultivation systems are connected together.

In one embodiment, OAACS provides an algae cultivation system that considers conditions, for example, geographic conditions, and the algae cultivation system is constructed to utilize the natural mixing of wind and waves to achieve high gas transfer rates with the atmosphere and good mixing. It does this by using a flexible algae impermeable liner for the algae cultivation system bottom and, in some embodiments, the geometry and orientation of the system are arranged to maximize wind and wave mixing as well as creating a current within the system. For example, long rectangular systems oriented with their long dimension parallel to the wind will experience significant mixing and current flow that can be used to advantage. Oceanic winds, such as those in equatorial regions, blow predictably in one direction, in this case East to West or vice versa. The mixing from such winds, and the waves they generate, causes gas exchange rates to increase 10-20 fold or more compared to more quiescent conditions (Garbe et al. 2014). Data on ocean winds and currents, as collated by NASA's Physical Oceanography Program, can be used to choose the best locations to situate the algae cultivation systems. This information may be obtained on the internet, and there are resources such as "Ocean Motion and Surface Currents" that can give up-to-date information and also provide a research tool for determining the ideal placements for a floating system. Sloped terrestrial algae ponds operating under similar conditions, but requiring $CO_2$ sparging because of calmer environmental conditions, generate very high dry algae yields of 54 $g/m^2/day$ (Heussler et al. 1978).

In one embodiment of OAACS the algae cultivation system is such that the buoyant framework has at least one member that is a tubular element or pipe or a bundle of at least 2 tubular elements or pipes.

OAACS may, in one embodiment, comprise a buoyant framework which is rectangular or mostly rectangular.

In another embodiment of OAACS, the algae cultivation system floating on the surface of a body of water has a buoyant framework that may comprise one or more ballast tubes or tanks.

In another embodiment of OAACS, the algae cultivation system floating on the surface of a body of water has a buoyant framework that may comprise transverse members.

Additionally, another embodiment of OAACS provides an algae cultivation system with a buoyant framework incorporating tubes or pipes that also function as ballast tanks and conduits to pump in nutrients and pump out the culture for harvest. In this way, operational costs, including harvesting, are kept to a minimum. In addition, when the system is submerged, ballast tanks are filled with the culture so that it can be used to quickly initiate growth and harvesting in the system following submersion and surfacing processes.

In one embodiment, OAACS comprises an algae impermeable liner, wherein said algae impermeable liner is less dense than the density of the body of water.

In one embodiment, OAACS comprises pumps to recycle the culture from the downstream end of the containment structure to the upstream and comprises pipes to fill the system on the upstream side and empty it on the downstream side.

The elements of OAACS, when combined as described herein, potentiate large scale algae farming and smaller scale-down systems for testing system components. In this way, large scale systems can be developed and huge areas of previously unusable water surface can be utilized for the production of biomass.

Another aspect of OAACS provides the use of the algae cultivation system as described herein, to grow algae cultures in the containment structure by exposing them to sunlight, wind and waves, wherein the system is used on an ocean or any other body of water. Therefore, OAACS may be used to utilize the natural mixing of wind and waves to achieve high gas transfer rates with the atmosphere and good mixing without the need for additional energy input.

In one embodiment, OAACS provides a floating generally rectangular algae cultivation system with a length, a width, and ends designed for flotation and positioning on the surface of a body of water and wherein the positioning is for creation of a unidirectional longitudinal wind driven surface current of an algae culture within the system comprising: a buoyant framework arranged into longitudinal members along the entire length and transverse members along the entire width with a set of two longitudinal and two transverse members forming all four of the ends, wherein the longitudinal and transverse members comprise pipes that are conduits for a plurality of process fluids selected from the group comprising nutrient feeds, culture, and surrounding water; an algae impermeable liner attached to the longitudinal members, wherein the buoyant framework and the algae impermeable liner create a containment structure; a mooring system; and at least one of culture harvesting and nutrient replenishment systems positioned at each of the two transverse members forming two of the ends.

In another embodiment, OAACS further comprises at least one interior transverse member. In some embodiments OAACS further comprises at least one of culture harvesting and nutrient replenishment systems positioned at the interior transverse member.

In another embodiment, OAACS provides a mooring system comprising a mooring line.

In another embodiment, OAACS provides an algae cultivation system wherein the mooring system comprises a buoy system.

In another embodiment, OAACS provides an algae cultivation system wherein the buoyant framework comprises at least one bundle of at least two tubes.

In another embodiment, OAACS provides an algae cultivation system wherein at least one of the longitudinal members connects to at least one of a ship, platform, buoy, tank, or a piping network.

In another embodiment, OAACS provides an algae cultivation system wherein the nutrient feeds include at least one selected from the group consisting of nitrogen, iron, and phosphorous.

In another embodiment, OAACS provides an algae cultivation system wherein the interior transverse member further comprises at least one platform.

In another embodiment, OAACS provides an algae cultivation system wherein the system is more than 1 kilometer long and more than 100 meters wide.

In another embodiment, OAACS provides an algae cultivation system wherein the longitudinal members comprise at least one bundle of at least two pipes and at least one of the pipes is a ballast tube.

In another embodiment, OAACS provides an algae cultivation system wherein the cultivation system further comprises the process fluids.

In another embodiment, OAACS provides an algae cultivation system wherein the process fluids comprise a culture in the containment structure.

In another embodiment, OAACS provides an algae cultivation system wherein the platform comprises at least one platform support that floats on top of the culture and is arranged to form lengthwise channels together with the algae impermeable liner.

OAACS' design reduces the installation and operating costs associated with algae cultivation systems, some to almost insignificant levels. It does this in several ways. First, OAACS is aquatic, which essentially eliminates the cost of water. The system can be set up in an ocean or any other body of water large enough to contain it. Second, some embodiments of OAACS are submersible, thereby sequestering them during severe weather conditions. This enables them to be constructed of low-cost materials adequate to create an enclosed system during fair weather and escape the harshest surface conditions during foul weather. In this way, installation and maintenance costs are kept to a minimum. Even when not submersible, the large size and floating nature of OAACS leads to reduced infrastructure costs. In some embodiments of OAACS, the overall system is constructed of low-cost repeating units that can be coupled together to give a virtually unlimited size facility. Third, OAACS relies on the natural mixing of wind and waves to achieve excellent gas transfer with the atmosphere without the regular need for additional energy input. It does this by using a flexible algae impermeable liner for the system bottom. The OAACS' structure is aligned with the wind, with the longitudinal sides parallel to the wind, and the algae culture is introduced at the upwind, or upstream, transverse side. The wind conveys the culture parallel to the longitudinal framework members, and judicious harvesting of culture and/or replenishment of nutrients at downstream transverse members, including at least the downstream end transverse member and optionally interior transverse members, allows for efficient operation. In some embodiments, the OAACS' framework incorporates tubes and pipes that also function as ballast tanks and conduits to pump in nutrients and pump out the culture for harvest. In this way operational costs are kept low. In addition, when the submersible systems are submerged, ballast tanks can be filled with a portion of the culture so that it is not lost in the submersion process.

Despite the advantages of OAACS compared to other cultivation systems, growth of algae in it without the use of supplemental $CO_2$ limits aerial yields. Despite the excellent mixing inherent to it, supply of $CO_2$ from the surrounding air is limited, and growth rates<15 g ash free dry weight (AFDW)/m²/day are obtained when rates >15 g AFDW/m²/day are possible when $CO_2$ is not limiting. In addition, slow growth rates do not support cultures with the highest possible cell densities that help reduce harvesting costs.

Traditional algae cultivation systems have overcome $CO_2$ limited growth by supplementing the growing cultures with $CO_2$ in the form of $CO_2$ gas, gas mixtures with enhanced concentrations of $CO_2$, and/or dissolved or dissolvable carbonate species. When growing algae commercially, this has the disadvantage of increasing costs, since the supplemental $CO_2$ has to be externally added. Also, as cultivation systems get larger, the logistics of managing a sufficient external $CO_2$ supply becomes burdensome. Finally, supplementing algae cultures with $CO_2$ reduces the magnitude of a major environmental benefit of growing algae for biofuels, which is direct removal of $CO_2$ from the environment.

There is a need in the art for providing a system for economically and efficiently growing algae at large scales previously limited by facility and operating costs, available high insolation area, nutrient costs, energy costs, and the ability to directly and durably uptake nutrients from the environment, especially $CO_2$.

SUMMARY OF THE DISCLOSURE

Unlike traditional algae cultivation systems like raceway ponds familiar to persons having ordinary skill in the art, where the surrounding air is the only direct environmental source of $CO_2$, OAACS operates in a distinctive algae cultivation environment where the containment structure is adjacent to surrounding water. Because OAACS is designed to exploit strong unidirectional winds that generate a rapid unidirectional flow of the culture within the system with vigorous culture mixing, dissolved inorganic carbon (DIC) in the surrounding water becomes a potential low cost direct environmental source of $CO_2$ for growing cultures in ways not possible with other cultivation systems like terrestrial raceway ponds. Disclosed algae impermeable liners with semipermeable liner sections are capable of sustained transfer of large amounts of DIC from the surrounding water to the culture that make external $CO_2$ supplies unnecessary. OAACS structural elements enabling placement of the system in surrounding water and generation of steady unidirectional culture currents driven by the wind, in addition to the presently disclosed semipermeable liner sections to supply $CO_2$ to the culture at high rates and low costs, results in low installation and operating costs and high areal yields not achievable by other algae cultivation systems.

While conventional semipermeable liner sections may adequately retain the algae culture within the cultivation area, they are unsuitable for use with OAACS because they lack the required flexibility, strength, permeability, and resistance to clogging and fouling, are environmentally unfriendly to manufacture, aren't easily manufactured at the scales needed for OAACS, and have high unit costs. For example, filter membranes are often manufactured by dissolving membrane materials in organic solvents (Tan and Rodrigue 2019), which raises costs and environmental release issues. Many traditional techniques tend to be unscalable and use materials like cellulose nitrate and cellulose acetate that lack the flexibility and strength to withstand OAACS' operating conditions. The resultant filters or membranes also can have relatively low porosities and permeabilities. Moreover, use of a semipermeable liner section raises the potential complication that nutrients added to the culture can escape into the surrounding water instead of being consumed by the culture.

Semipermeable liner sections for efficient DIC transfer from the surrounding water to the interior algal culture in an OAACS system to improve operations are disclosed. These semipermeable liner sections have high permeability for DIC but low permeability for the growing culture and are designed for robust and durable operation and are described further herein. In addition, algae impermeable liners with nutrient impermeable liner sections that minimize losses of added nutrients from the culture to the surrounding water are also disclosed.

Embodiments of the disclosure include embodiments of OAACS previously disclosed wherein the algae impermeable liner further comprises at least one semipermeable liner section that is permeable to dissolved inorganic carbon.

In another embodiment of the algae cultivation system, the algae impermeable liner comprises at least one nutrient impermeable liner section that is mostly impermeable to nutrients added to the system. One embodiment of the algae cultivation system has the nutrient impermeable liner section starting at the interior transverse member and continuing downstream from it.

In another embodiment of the algae cultivation system, the semipermeable liner section comprises fibers. In further embodiments of the algae cultivation system, the fibers comprise at least one hydrophobic fiber. In further embodiments of the algae cultivation system, the fibers comprise at least one amphiphilic molecule. In some embodiments of the algae cultivation system, the amphiphilic molecule is glycerol monostearate. In some embodiments of the algae cultivation system, the amphiphilic molecule has an average of n hydrophobic groups, and n is large. In some embodiments of the algae cultivation system, the amphiphilic molecule is polyvinyl alcohol esterified with stearic acid to generate poly[(vinyl alcohol)-(stearic acid)].

In one embodiment of the algae cultivation system, the semipermeable liner section comprises a gradient of pore sizes with the largest pores on the outer surfaces of the liner and the smallest pores in the interior of the liner.

One embodiment of the disclosure is a photobioreactor comprising a clear tube with end caps divided in half along its longitudinal axis creating two halves of the tube and the end caps, a semipermeable liner section sealed between the two halves, at least one clamp to seal the liner in the tube, at least one inlet and at least one outlet in each of the halves of the tube, and a light source.

One embodiment of the disclosure is a semipermeable liner section having two planar surfaces, an interior, and pores through the interior comprising fibers comprising at least one hydrophobic fiber and at least one amphiphilic molecule comprising at least one hydrophilic group and n hydrophobic groups, wherein n is large. Another embodiment of the disclosure is a semipermeable liner section comprising a gradient of pore sizes with the largest pores on the two planar surfaces and the smallest pores in the interior.

Before explaining the disclosed embodiments of the algae cultivation system in detail, it is to be understood that the algae cultivation system is not limited in its application to the details of the particular arrangement shown, since the algae cultivation system is capable of other embodiments. Also, the terminology used herein is for the purpose of description and not of limitation.

DETAILED DESCRIPTION OF THE DRAWINGS

Figure 1:
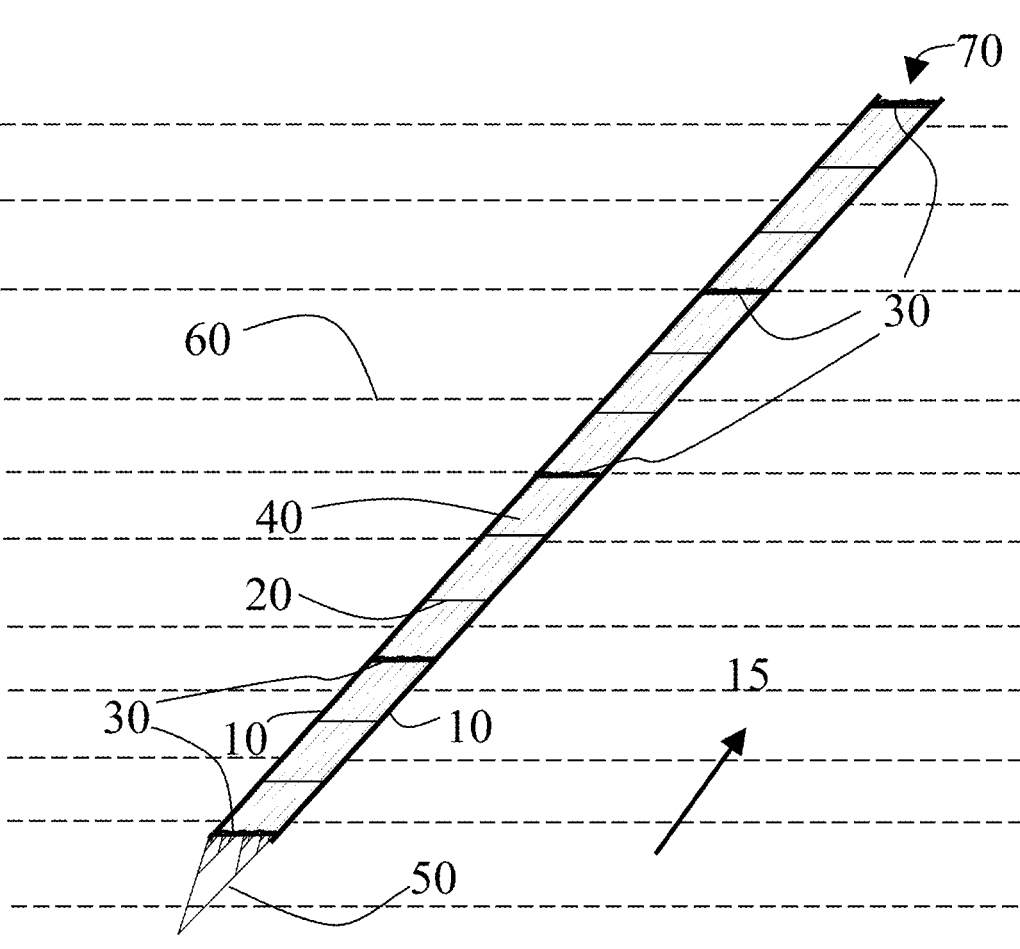
FIG. 1 is a perspective view diagram of OAACS showing the algae impermeable liner.
Figure 2:
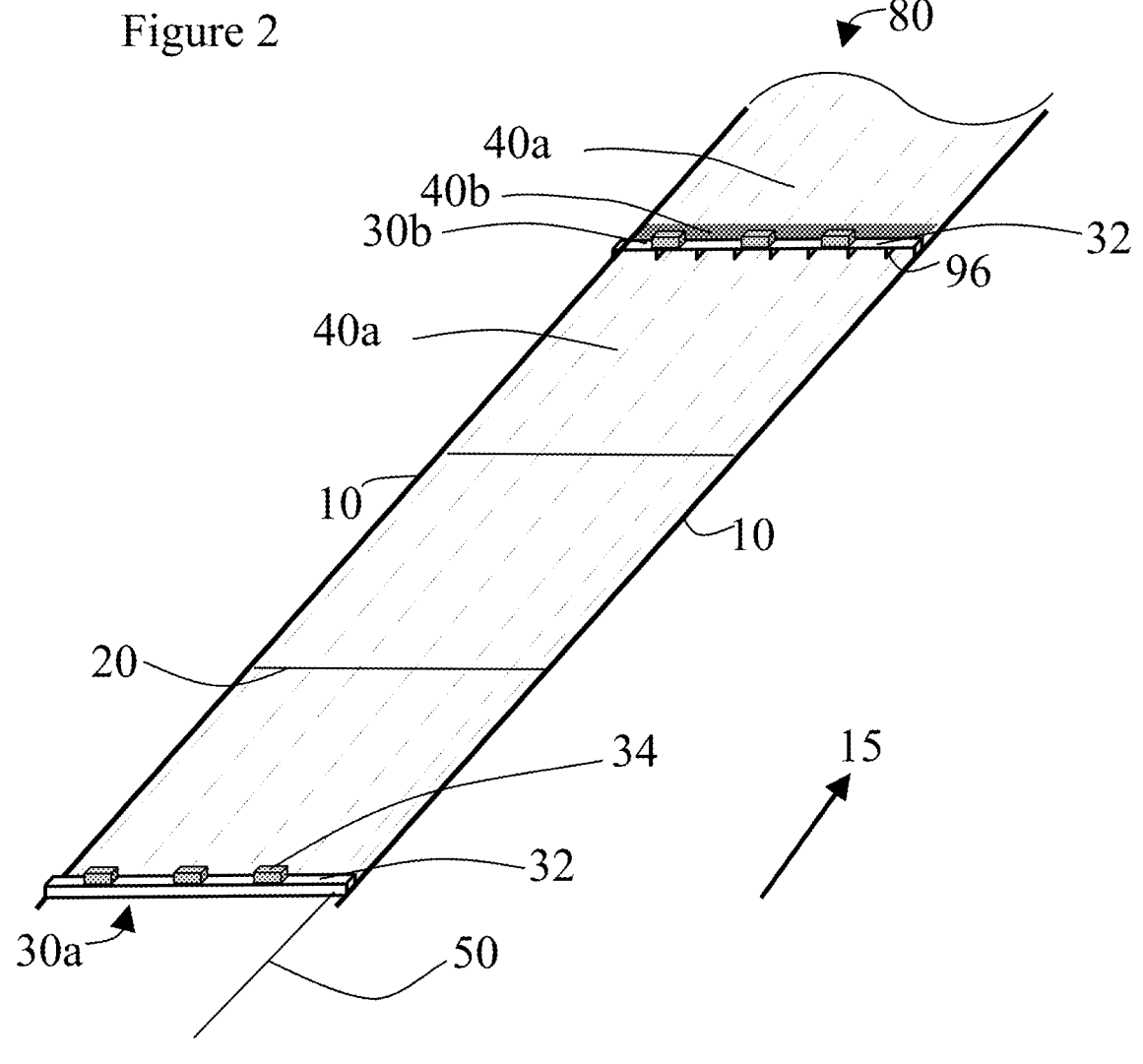
FIG. 2 is a more detailed perspective view diagram of a section of OAACS in FIG. 1 showing the algae impermeable liner with semipermeable and nutrient impermeable liner sections.

Nonlimiting embodiments of the algae cultivation system are illustrated schematically in FIGS. 1 and 2. FIG. 1 shows a single OAACS installation 70, a design appropriate for large scale systems encompassing cultivation areas hundreds of meters wide and several kilometers long or larger. A single point mooring system (SPM) 50 and transverse supports 20, which may be anything known to one of ordinary skill in the art, including, as nonlimiting examples, rods or cables, stabilize the position and integrity of the structure, respectively. The SPM 50 is a nonlimiting example of an appropriate mooring system with mooring lines shown but not individually labeled. The mooring system includes mooring lines that anchor the OAACS installation to a permanent fixture like the sea floor or a structure anchored to the sea floor. The disclosed algae impermeable liner 40 is attached to longitudinal members 10, and a culture containment structure is formed by the algae impermeable liner 40 and the buoyant framework comprising the longitudinal members 10 and transverse members 30. The containment structure is physically separated from the surrounding water 60 by the algae impermeable liner and buoyant framework. The large arrow 15 indicates the direction of the wind, so that the transverse member 30 where the SPM connects with the buoyant framework is the upstream end of OAACS 70, and the opposite transverse end is the downstream end. Culture and nutrients are introduced at the upstream end of the system and flow downstream. The pipes of the longitudinal members 10 and transverse members 30 can connect to adjacent OAACS installations, ships, platforms, piping networks, tanks, etc. The longitudinal members 10 and plurality of transverse members 30 enables for the efficient management of culture along the entire length of the system and between two consecutive transverse members 30. Each framework member and its constituent tubes and pipes are independently controlled, and appropriate valves, pumps, and other equipment familiar to one of ordinary skill in the art enables transfer of materials to and from framework members. While not detailed in FIG. 1, OAACS 70 comprises other elements familiar to one of ordinary skill in the art to assist operations. These include, but are not limited to, pumps, valves, winches, sampling devices, sensors, beacons, two-way radios, buoys, rafts, boats, supplies, tanks, etc.

The buoyant framework of OAACS may have a rectangular shape, as is specifically depicted in FIG. 1, or it may have a different shape, such as a non-equiangular quadrilateral or a non-regular polygon with 5 or more sides. The important factor regarding the shape is that it is fashioned to utilize the natural mixing of wind and waves to establish a unidirectional current of the culture moving from the upstream to the downstream end. For example, a non-equiangular quadrilateral or hexagon with the downstream end transverse member shorter than the upstream end transverse member might facilitate harvesting by increasing the culture depth at the downstream end. Therefore, the OAACS depicted in FIG. 1 has a generally rectangular shape in which the overall shape can have some deviation from a rectangle but is generally recognizable as having a rectangular length and width but could be a non-equiangular quadrilateral, a non-regular polygon with 5 or more sides, or other similar shapes that deviate from a perfect rectangle.

FIG. 1, and FIG. 2 as described below, depicts an OAACS installation with interior transverse members 30 in addition to transverse members at the upstream and downstream ends of the system. However, there might be instances when interior transverse members are not necessary for efficient operation of OAACS. In this case, OAACS can be constructed without interior transverse members without compromising performance.

Details of the longitudinal members 10 and transverse members 30 aren't discernible in FIG. 1, but both framework members 10 and 30 are composite framework members that comprise multiple pipes and/or tubes for various purposes. Examples include, but are not limited to, ballast tubes for the culture, ballast tubes for the surrounding water, and/or separate pipes for process fluids like culture harvest, culture inoculum, nutrient feeds, and surrounding water. Spacers can be included to protect the tubes from damaging each other, and a variety of circumferential bands and points of attachment can also be used. Multiple pipes comprising a portion of composite framework members 10 and 30 can be bundled together and attached to other bundles enabling construction of frameworks of almost unlimited size with sections with multiple tubes and pipes for each purpose. The composite nature of the buoyant framework members 10 and 30 enables control of the flotation of the structure using ballast tubes and efficient management of the culture using pipes for the addition/removal of culture, nutrient feeds, other agents, and surrounding water to and/or from the containment structure. Nonlimiting examples of other agents are non-nutrient additives that help maintain the health and robustness of the culture or facilitate harvesting.

FIG. 2 is a more detailed perspective view of a section 80 of OAACS 70. The depiction of the system is cut off at the wavy line at the downstream end of the drawing. Also, only a single element of the SPM 50 from the OAACS 70 is shown to simplify the figure. In this nonlimiting embodiment, the disclosed algae impermeable liner 40 is comprised of different sections. In the first section, semipermeable liner section 40a is permeable to DIC but largely impermeable to the growing culture to adequately retain it in the cultivation area and at least mostly prevent it from passing into the surrounding water. It extends from upstream end transverse member 30a to interior transverse member 30b, and can be discontinuous and include other areas as described below. In the second algae impermeable liner section, which also can be discontinuous and include more than one area of the liner, nutrient impermeable liner section 40b is shown starting at interior transverse member 30b and continuing downstream from it. It is largely impermeable to both algae and nutrients. The longitudinal length of the nutrient impermeable liner section 40b is such that the culture has enough time to uptake or consume an acceptable quantity of nutrients added at interior transverse member 30b before the flow reaches the next downstream semipermeable liner section 40a. Nutrient impermeable liner sections 40b can be placed anywhere desired, such as at the interior transverse members and extending downstream far enough along the longitudinal length of OAACS 70. In this nonlimiting embodiment, the culture is premixed with nutrients prior to adding it at the upstream end of the system so that the culture has sufficient time to fully uptake added nutrients so a nutrient impermeable liner section 40*b* isn't needed there. It should be noted that if the algae being cultivated has sufficiently rapid nutrient uptake then nutrient impermeable liner sections aren't needed anywhere in order to prevent unacceptable quantities of nutrients leaking into the surrounding water. Also shown are platform 32, equipment 34, and platform support 96. The platform supports float in the culture and surrounding water and are arranged to form lengthwise channels together with the algae impermeable liner to allow the culture current to flow largely undisturbed between them.

Figure 3:
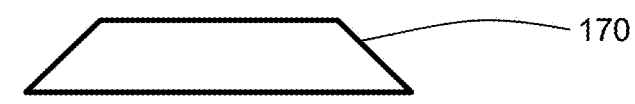
FIG. 3 is a perspective view diagram of a laboratory cultivation system that can be used as a scale-down model of OAACS.
Figure 3:
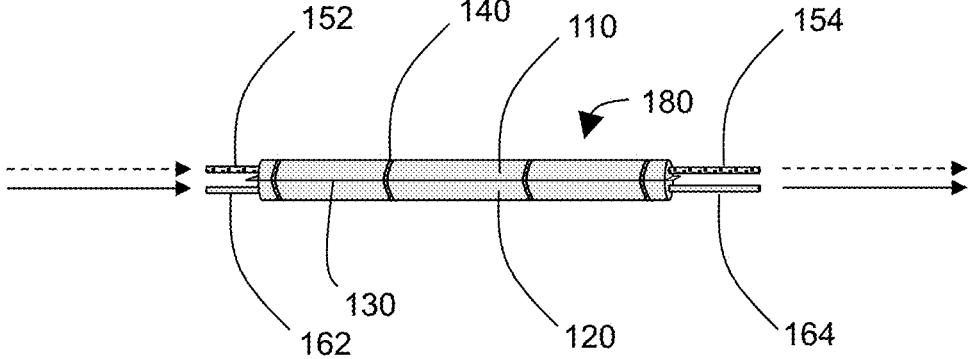

FIG. 3 is a schematic of one type of laboratory photobioreactor (PBR) that can be used to test semipermeable liner sections for their performance before deploying them in large-scale OAACS installations. The PBR comprises largely transparent tubing 180 with end caps (not labelled) of the appropriate diameter, as described below, that is split in half along its length to divide the tube and end caps into a culture chamber 110 and a surrounding water chamber 120. Polycarbonate is a nonlimiting example of material that can be used for the tubing. A test semipermeable liner section 130 is sandwiched between the two halves of the transparent tubing and end caps and sealed with appropriate clamps 140, only one of which is labelled. The semipermeable liner section separates the tubing 180 and end caps into the upper culture side and the lower surrounding water side. The tubing 180 and end caps have a culture chamber inlet 152, culture chamber outlet 154, surrounding water chamber inlet 162, and surrounding water chamber outlet 164, as shown. The culture chamber inlet 152 and outlet 154 are connected to a culture reservoir (not shown). The surrounding water inlet 162 and outlet 164 are connected to a surrounding water reservoir (not shown). Appropriate media for the culture and the surrounding water are used in the culture and surrounding water reservoirs, respectively, as explained below. Pumps (not shown) establish circulatory flow between the chambers and their respective reservoirs with flow in the direction of the arrows as shown. Countercurrent flow can also be established with the PBR in FIG. 3, although this is not representative of the co-current flow that occurs in large-scale OAACS installations. Light 170 provides appropriate illumination to support photosynthesis of the culture.

DETAILED DESCRIPTION OF THE DISCLOSURE

The term "nutrient", as used herein, is generally meant to include soluble nutrients and not macroscopic components, although these could also be present.

The term "algae" and "biomass", as used herein, is meant in its broadest sense to include any organism with chlorophyll a and lacking a differentiated thallus (except that the term "biomass" may be used to more generically refer to a wider variety of plant and/or animal-derived organic matter). As such, the definition includes both eukaryotic and prokaryotic organisms. These terms may also include organisms modified artificially or by gene manipulation. While OAACS is particularly suited for the growth of algae or photosynthetic bacteria, and while in the discussion below, the features and capabilities of certain embodiments are discussed in the context of the utilization of algae as the photosynthetic organisms, it should be understood that, in other embodiments, other photosynthetic organisms may be utilized in place of, or in addition to, algae. In general, certain embodiments of the algae cultivation system may be designed to support the growth of unicellular, motile or sessile, flagellated or non-flagellated, phototrophic organisms. In some cases, use of OAACS for growth of non-photosynthetic organisms might be desired.

The term "algae" may further refer to photosynthetic protists responsible for much of the photosynthesis on Earth. As a group, the algae are polyphyletic. Accordingly, the term may refer to any organisms from the following groups, alveolates, chloraraachniophytes, cryptomonads, euglenids, lemnids, glaucophytes, haptophytes, red algae such as Rhodophyta, stramenopiles, and viridaeplantae. The term refers to the green, yellow-green, brown, and red algae in the eukaryotes. The term may also refer to the cyanobacteria in the prokaryotes. The term also refers to green algae, blue algae, and red algae.

For an embodiment utilizing one or more species of algae, algae of various types, (for example *Chlorella, Chlamdomonas, Chaetoceros, Spirulina, Crocosphaera, Trichodesmium, Dunaliella, Porphyridum, Hematococcus*, etc.) may be cultivated, alone or in various combinations, in OAACS. Of course, one or more of these and/or other algae types may be used in certain embodiments. As nonlimiting examples, one or more of the following may be grown—*Nannochloris* sp., *Tetraselmis chui, Dunaliella salina, Pleurochrysis carterae, Tahitian Isochrysis* sp., *Rhodomonas salina, Pichochlorum oklahomensis, Pavlova lutheri, Phaeodactylum tricornutum, Tahitian Isochrysis, Skeletonema caustatum, Nannochloropsis oculata, Chlorella minutissima, Botryodopsis arhiza, Scenedesmus dimorphus, Heterococcus mainxii, Chlorella protothecoides, Ankistrodesmus braunii, Heterococcus brevicellularis, Monodus subterraneus, Microspora* sp., *Nannochloropsis* sp., *Porphyridium* sp., *Chlorella* sp., *Neochloris oleoabundans, Chlorella vulgaris, Chlamydomonas acidophila, Spirulina platensis, Haematococcus lacustris, Aphanizomenon flos-aquae, Ankistrodesmus falcatus, Botryococcus sudeticus, Coscinodiscus* sp., *Coscinodiscus wailisii, Crocosphaera watsonii, Dunaliealla bardawil, Dunaliella tertiolecta, Chaetocerous muelleri, Chaetoceros gracilis, Amphora* sp., *Amphora coffeaeformis, Ulva* sp., *Tetraselmis suecica, Trichodesmium erythraeum, Platymonas* sp., *Navicula lenzii, Chlamydomonas* sp., *Tetraselmis* sp., *Scenedesmus quadricuada, Chlorella sorokiniana*, and *Selenastrum minutum*. In some embodiments using one or more species of macroalgae, macroalgae of various types, (for example *Chondrus, Porphyra, Palmaria, Laminaria, Ulva*, etc.) may be cultivated, alone or in various combinations, in OAACS.

The term "amphiphilic", as used herein, includes molecules possessing both hydrophilic (water-loving, polar) and hydrophobic (water-averting) properties. The hydrophilic group falls into one of the following categories: anionic, including carboxylates $$(RCO_2^-),$$

sulfates $$(RSO_4^-),$$

sulfonates $$(RSO_3^-),$$

and phosphates (e.g. the charged group in phospholipids), where R represents the hydrophobic group of the amphiphilic molecule; cationic, including primary, secondary, tertiary and quaternary amines; and polar, uncharged groups, including alcohols with large R groups, such as diacyl glycerol. The hydrophobic group is typically a large hydrocarbon moiety, such as a long chain of the form $CH_3(CH_2)_m$, with m>4. Often, amphiphilic species have more than one hydrophobic group, more than one hydrophilic group, or more than one of both.

The term "durable", as used herein, is meant to indicate that physical, chemical, and/or operational properties are mostly steady over a given period.

The term "semipermeable liner section", as used herein, includes any planar sheet that comprises pores that allow selective passage of some molecules from one side of the planar sheet to the other. It includes filters and membranes and sheets that appear flat when viewed from afar but can be non-flat when viewed up close. Examples of non-flat topographies up close include corrugated sheets and woven and non-woven fiber membranes that are non-flat when viewed at a magnification that resolves individual fibers.

The term "polymer", as used herein, includes substances or materials consisting of one or more repeating monomers, where the total number of monomers is four or more. Examples of polymeric materials include, but are not limited to, polyesters such as poly(ethylene terephthalate) (PET), poly(butylene terephthalate), polycaprolactone (PCL), and poly(ethylene naphthalate)polyethylene; naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); polyethylenes such as polyethyele oxide (PEO); poly(meth) acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides such as nylon, nylon 6,6, polycaprolactam, and polyamide 6 (PA6); polyvinylacetate; polyether-amides. Also suitable are copolymers such as styrene-acrylonitrile copolymer (SAN), styrene-ethylene copolymer; and poly(ethylene-1,4-cyclohex-ylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers.

The term "large", as used herein when referring to the average number, n, of hydrophobic groups in an amphiphilic molecule, means generally that n>>1. Specific values of large n may include n equal to 4 or more, 5 or more, 6 or more, 7 or more, 8 or more, 9 or more, 10 or more, 11-20, 20 or more, 20-25, 26-30, 31-40, 41-50, 50 or more, 100 or more, etc.

Systems to enable submersion of OAACS 70 aren't shown in FIG. 1 but can be added as in previous disclosures. These systems include, but are not limited to, ballast tubes, submerging lines, spools, winches, pressure and level gauges, and pressure relief valves. In one embodiment of the algae cultivation system, OAACS 70 is suspended (that is, between sea or ocean floor and surface) horizontally during submersion. In alternate embodiments, OAACS 70 may be suspended in an attitude ranging from horizontal to vertical. OAACS 70 is restrained by mooring lines that are themselves anchored to the seabed or structures anchored to the seabed, with OAACS 70 itself remaining positively buoyant enough to keep such lines taut and its position thus fixed. In an alternate embodiment, OAACS 70 may be restrained by mooring lines, however in a manner so as to allow more mobility of OAACS 70 in response to wind and water motions. The OAACS 70 may have a single mooring line. The OAACS 70 may have more than one mooring line. The OAACS 70 may have 2, 3, 4, 5, 6, 7, 8, 9, or 10 or more mooring lines. An additional embodiment of the algae cultivation system provides that the free end of each mooring line assembly is retained at the surface by specialized buoys, while the anchored end may be at a great depth. Between anchor point and maximum-depth operational position, the mooring lines are preferably affixed with flotation devices, allowing the burden borne by the buoys to be only that of the length of mooring line between the surface and said maximum operational depth.

In one embodiment, OAACS 70 may have, for a controlled means of descent and ascent, an on-board winch system. In concert with buoyancy control of OAACS 70, through methods known to one of ordinary skill in the art or as disclosed in the present application, the winch system enables OAACS 70 to "crawl" down its mooring lines from the surface, and to likewise ascend (assisted by variable buoyancy) for harvesting, maintenance or other purposes. The winches may be of a "take-up" design (e.g., a drum reeling a cable thereon); other embodiments, however, employ (in the region of operational descent) chains that are readily engaged for tractive purposes, thereby obviating the need for take-up drums or other on-board holding facilities, and precluding any added mass onboard the buoyant framework assembly.

In one embodiment of the algae cultivation system, the presence of substantially unidirectional ocean currents is taken advantage of to maintain adequate separation between mooring lines and keeping all lines from entanglement. Said current further serves to fix OAACS 70 in operating position by virtue of its forces being reacted by the buoyant framework's mooring lines.

Additional embodiments of the algae cultivation system include the use of retractable lines to facilitate the positioning of OAACS 70 while on the surface, during submersion, and/or during surfacing. Use of a retractable line enables rapid re-establishment of a prior configuration following a shift away from said configuration.

In one embodiment of the algae cultivation system, equipment to control the position and operation of OAACS 70 are located on said OAACS 70. In one embodiment of the algae cultivation system, equipment to control the position and operation of OAACS 70 are located remote to said OAACS 70, such as on a buoy, a different OAACS, a boat, a satellite, or on land. In another embodiment of the algae cultivation system, some equipment to control the position and operation of OAACS 70 are located on said OAACS 70 and some equipment are located remote to it as described above. Methods of transmitting signals between a remote location and OAACS 70 are well known to those of ordinary skill in the art.

One embodiment of the algae cultivation system includes a method of construction of OAACS 70 with composite framework members comprising many pipes. Although there is a practical limit to the diameter of plastic tubes, the use of a collection of tubes enables construction of larger OAACS 70 installations than would otherwise be possible. An additional embodiment of the algae cultivation system is an OAACS 70 with more than one tube and said two or more tubes are used for two or more purposes. In one embodiment, the algae cultivation system provides an OAACS 70 with one or more ballast tubes. In another embodiment, the algae cultivation system provides an OAACS 70 with one or more ballast tubes filled with one or more of water, air, culture, surrounding water, and nutrients. In another embodiment, the algae cultivation system further comprises spacers. In an additional embodiment, OAACS 70 comprises framework members having 2, 2 or more, 3, 3 or more, 4, 5, 6, 7, 8, 9, 10, 11, 12, 13, 14, 15, 16, 17, 18, 19, 20-25, 26-30, 31-40, 41-50, 51, or 52 or more tubes and pipes bundled together.

In one embodiment of the algae cultivation system, the culture is exposed to sunlight, wind, and/or waves when ballast tubes comprising part of longitudinal members 10 are emptied of culture or are full or partially full of air. In another embodiment, the algae impermeable liner 40 is made of materials less dense than the surrounding water and, thus, tends to float. One embodiment of the algae cultivation system provides for the use of materials less dense than the surrounding water, for example the tubes, the pipes, the spacers, etc., of the buoyant framework members 10 and 30, to make them buoyant. Another embodiment of the algae cultivation system provides components including the buoyant framework members 10 and 30, their tubes, spacers, pipes, etc. made buoyant with air to modulate the buoyant framework's buoyancy. An additional embodiment of the algae cultivation system provides the modulation of buoyancy of the buoyant framework of OAACS and/or its tubes by using the algae culture as ballast.

Alternate embodiments of the algae cultivation system use other methods for joining individual OAACS installations together. For example, as in (Baan 2005), an apparatus is disclosed for mooring to floating vessels side-by-side, and this method can be used with the algae cultivation system. In this embodiment, the first OAACS installation is moored to the seabed by a single point mooring system. The apparatus comprises an arm with proximal and distal ends and the arm is mountable on the first OAACS installation for rotation about a vertical axis and the distal end projects outwardly from the first OAACS installation in use. A substantially inelastic mooring line is attached to the distal end of the arm and is securable to the second OAACS installation. The resilient means is operable to allow limited rotation of the arm about the axis in the first direction in response to tension in the mooring line which exceeds a pre-determined value. The resilient means automatically restores the arm to its former position upon reduction of the tension below the predetermined value. The arm is freely rotatable about the axis in a second direction opposite to the first direction. The resilient means can comprise a piston and cylinder mountable to the first OAACS installation adjacent the arm such that rotation of the arm in the first direction brings the arm into contact with the piston and to compress the piston into a cylinder when the tension on the mooring line exceeds the predetermined value, and wherein the cylinder is operable to extend the piston upon reduction of the tension below the predetermined value. Alternatively, the resilient means may comprise a stop member mountable on the first OAACS installation such that rotation of the arm in the first direction brings the arm into contact with the stop member, and a piston and cylinder mounted on the distal end of the arm between the arm and the mooring line and operable to extend when the tension on the mooring line exceeds the predetermined value, and to retract upon reduction of the tension below the predetermined value. In another embodiment, these methods may be used with OAACS 70.

As used herein, a mooring line is a submersion line, a chain, a rope, strap, pipe, cord or any other type of line used to tie a floating or submerged object to a docking object. Those of ordinary skill in the art will understand the many possible options for mooring and/or tethering OAACS 70, and nonlimiting examples are found in (Grosenbaugh 1995) and (Grosenbaugh 1996). These describe some of the possible mooring systems which may be used with the algae cultivation system and are incorporated by reference herein. In one aspect, OAACS 70 further comprises a mooring system. In an additional aspect of the algae cultivation system, the mooring system is constructed from one or more of a cable, a chain, a rope, or a tether assembly, which will be suitable to anchor OAACS 70. Another aspect of the algae cultivation system provides an OAACS 70 with a mooring system suitable to anchor OAACS 70 in its intended environment (for example, there will be some instances of the algae cultivation system in which suitable mooring systems for a lake will not be all the same as suitable mooring systems for the ocean). In another embodiment of the algae cultivation system, the mooring system will fix OAACS 70 to a desired location or orientation in relation to other OAACS 70s. In an additional embodiment of the algae cultivation system, the mooring system comprises more than one mooring line. Another embodiment of the algae cultivation system provides an OAACS 70 with a mooring system that has sufficient slack in the line so as to allow some mobility for OAACS 70, and in particular sufficient mobility to maximize transfer of $CO_2$ in the algae cultures being cultivated. In still other embodiments of the algae cultivation system, the mooring system may be constructed from elastic or somewhat elastic materials to allow for flexibility, such as rubber tethers, synthetic rope, or other materials known to one of ordinary skill in the art. Other embodiments of the algae cultivation system include a mooring system constructed from a chain or from a pipe. Algorithms provided by Grosenbaugh, et al. and known to those ordinarily skilled in the art may be applied to the algae cultivation system in order to provide specific mooring systems for the algae cultivation system, adapted to the intended environment in which OAACS 70 will be installed.

In an embodiment of the algae cultivation system, the depth of OAACS 70 is maintained between 0 cm and 50 cm. In one embodiment of the algae cultivation system, the depth is maintained between 0 cm and 10 cm. In another embodiment of the algae cultivation system, the depth is maintained between 10 cm and 30 cm. In another embodiment of the algae cultivation system, the depth is maintained more than 50 cm.

When OAACS 70 is operating on the surface of the surrounding water, the buoyant framework members 10 and 30 of the algae cultivation system are designed to provide adequate support to the algae impermeable liner 40 so that the culture is largely retained within the cultivation area and away from the surrounding water. Some exchange of the culture and surrounding water is permissible, as long as gross dilution or loss of the culture is prevented.

Those of ordinary skill in the art will recognize many equivalents to the descriptions provided herein, using different materials, organisms, and parts for the buoyant framework, algae impermeable liner, culture, and mooring system. For example, the buoyant framework can be made of wood, different plastics such as HDPE, LDPE, natural rubber, PP, PVC, different metals, etc. It can be made from barrels, pipes, tires, etc. The algae impermeable liner can be made of any material capable of forming a large flexible sheet impermeable to algae, like different plastics such as HDPE, LDPE, PP, PVC, etc. The mooring system can fasten to any fixed object such as a pier, quay, subsurface (seabed), land, or a floating object such as an anchor buoy, boat, floating platform, submerged platform, etc. All of the components can be constructed using commonly understood engineering principles, such as those found in (Mahamid, Gaylord, and Gaylord 2020). Additional components, as needed, like valves, pumps, winches, gauges, sensors, and other equipment can be added to OAACS 70 to enhance its operation.

A nonlimiting example of materials that can be used for the disclosed semipermeable liner sections are fiber sheets or membranes. Some methods for producing one-dimensional, or cylindrical fibers, into sheets to create the disclosed semipermeable liner sections are reviewed in (Kenry and Lim 2017). A novel co-extrusion and multiplication method for producing two-dimensional, or rectangular, fibers into nonwoven sheets is described by (Wang et al. 2014), the disclosure of which is hereby fully incorporated by reference herein. This method is potentially attractive for producing semipermeable liner sections for OAACS because it doesn't use any organic solvents, allows for post-extrusion crystal orientation of the fibers to increase their strength, and is easily scalable. In addition, innovatively exploiting some additional capabilities of the co-extrusion and multiplication method, as disclosed herein, are also beneficial.

Nanofibers are fibers with diameters in the nanometer range (typically, between 1 nm and 1 μm, but the term nanofiber is also used for fibers with diameters>1 μm) and are useful for comprising semipermeable liner sections when cultivating the smallest size algae using OAACS. Larger fibers are adequate when growing larger size algae or other larger organisms. Nanofibers can be generated from different polymers and hence have different physical properties and application potentials. Examples of natural polymers include collagen, cellulose, silk fibroin, keratin, gelatin and polysaccharides such as chitosan and alginate. Nonlimiting examples of synthetic polymers include poly(lactic acid) (PLA), polycaprolactone (PCL), [3] polyurethane (PU), poly(lactic-co-glycolic acid) (PLGA), poly(3-hydroxybutyrate-co-3-hydroxyvalerate) (PHBV), poly(ethylene-co-vinylacetate) (PEVA), polyethylene (PE), polypropylene (PP), polystyrene (PS), and polycarbonate (PC). Polymer chains are connected via covalent bonds. The diameters of nanofibers depend on the type of polymer used and the method of production. All polymer nanofibers are unique for their large surface area-to-volume ratio, high porosity, appreciable mechanical strength, and flexibility in functionalization compared to their microfiber counterparts.

A number of approaches used for fabricating continuous polymeric nanofibers include electrospinning, rotary jet spinning, and melt blowing. Electrospinning is currently the most widely used technique to fabricate polymer nanofibers at laboratory scales. Electrospinning is a procedure in which a thin jet of polymer solution or polymer melt ejects from a sufficiently charged needle toward a grounded substrate. Polymer nanofibers then form after the rapid evaporation of the solvent. The fiber diameters range from a 100 nm to several hundred nanometers; though, nanowires with diameters as small as 20 nm have been produced among traditional electrospun nanofibers using a process termed "electronetting". Electrospinning is typically solution-based because producing fibers less than a few microns in diameter with melt electrospinning remains difficult due to their high melt viscosities. Because of the solvent involved, electrospinning suffers from several limitations including low throughput and complexities in controlling processing parameters, such as voltage and solution concentration. Solvent-based electrospinning of polyethylene and polypropylene, which are the most widely used polymers globally, remains impractical due to a lack of proper solvents. Also, due to the random alignment of nanofibers produced by electrospinning, chain orientation is not possible once formed on a substrate, leading to insufficient mechanical strength that limits its applications to areas where mechanical performance is not an essential requirement.

Rotary jet spinning is a newer technique developed to produce polymer nanofibers from polymer solutions that are ejected from high-speed rotating nozzles. Fibers are elongated by centrifugal forces and solidify as solvent evaporates. Varying nozzle geometry, rotation speed, and polymer solution concentration can control fiber morphology, diameter, and web porosity. Nanofibers with diameters ranging from 150 nm to 3 mm have been generated by this process. Recently, another technique termed "gas jet process" was created to fabricate polymer nanofibers with diameters ranging from a few tens of nanometers to a few micrometers from polymer solutions. With the aid of high velocity expanding gas jets, single or multiple polymer solution(s) can be turned into liquid jets, which are thereafter stretched and thinned down into polymer nanofibers. However, similar to electrospinning, these processes have limited applications due to the toxicity related to the organic solvents used and limited mechanical performance.

Without the aid of solvents, fibers with diameters as low as 500 nm can be fabricated from polymer melts using a technique termed "melt blowing". In melt-blowing, a jet of hot air is applied at the orifice of the extrusion line, and fibers can be blown down to the nanoscale. However, this technique is only applicable to the preparation of nanofibers from polymer melts that have a low chain overlap concentration and is used mostly to produce microfibers. Another disadvantage is the usage of a modular die with a small orifice and air jets with pressure of 3500 psi or more, which leads to high cost and difficulty in scale-up applications.

A forced assembly co-extrusion and two-dimensional multiplication technique followed by an orientation and separation procedure overcomes the disadvantages of other techniques described above. Two innovative ways of improving the performance of OAACS is modifying the structure of the fibers comprising the semipermeable liner sections produced by a method like forced assembly coextrusion and two-dimensional multiplication technique by introducing pore size gradients and/or durably modifying the hydrophilicity of the fiber surfaces. A semipermeable liner section with a gradient of pore sizes in the direction perpendicular to the liner surface, with the largest pores at the liner surfaces and the smallest pores in the interior, will generate bidirectional steric forces away from the liner interior towards both liner surfaces that promotes movement of particles out of the liner, thus minimizing clogging. Likewise, a semipermeable liner section comprising fibers with durable more hydrophilic surfaces will minimize adsorption of organic hydrophobic molecules to them and reduce the rate of liner fouling. Use of a semipermeable liner section with either or both modifications will result in extended duration of operations before significant reductions in DIC transfer rates across the liner being observed.

One nonlimiting method to introduce pore size gradients into the OAACS' semipermeable liner sections using the co-extrusion and multiplication method is accomplished by adapting the gradient multilayer technique described by (Ponting et al. 2010), the disclosure of which is hereby fully incorporated by reference herein. This is done by using gradient layering during horizontal multiplication prior to extrusion through the tape die to generate the tape. This results in fibers, and thus pores in the extruded tape, with a continuous gradient of size from one horizontal side of the extruded tape or layer to the other. Sandwiching two tapes with the sides having the smallest fiber sizes together results in a semipermeable liner section having the desired structure with the smallest fibers and pores in the semipermeable liner section interior.

One nonlimiting method to increase the hydrophilicity of the fiber surfaces in semipermeable liner sections is to compound a hydrophobic fiber base material with durable amphiphilic molecules. If a hydrophobic fiber material is used as the main fiber material, thermodynamic forces will drive the hydrophobic groups of the amphiphilic molecules into the hydrophobic fiber material, and the hydrophilic groups will collect on the fiber's surface. Nonlimiting examples of hydrophobic fibers that can be used as the main fiber material include polyethylene, polypropylene, polyamides (nylon) like PA6, polyethylene terephthalate, polylactic acid, and polyvinylidene fluoride. Nonlimiting examples of amphiphilic molecules that can be used are glycerol monostearate and polyvinyl alcohol (PVA) esterified with stearic acid to generate poly[(vinyl alcohol)-(stearic acid)]. Poly[(vinyl alcohol)-(stearic acid)] preparation is described in (Ozcan and Kandirmaz, 2018) using acid catalyzed esterification, and the average degree of esterification was found to be 11%, or, in other words, 1/9 of the OH groups in PVA were esterified. An advantage of using poly[(vinyl alcohol)-(stearic acid)] is that the multiply substituted PVA molecule has an average of n sites of attachment into the hydrophobic fiber filter, where n is the average number of stearic acid molecules (the hydrophobic group) esterified to each PVA molecule, that stably anchors PVA to the fiber surface, and n can be large. If the PVA molecular formula is written as $CH_3[CH_2CH(OH)]_pCH_3$, then the molecular weight of PVA is approximately 30+44p grams/mole. If the degree of substitution is kept constant at 1/9, then for PVA with average molecular weight 500, p=10.7 and n=1.19 (which is small), for PVA with average molecular weight 5000, p=113, and n=12.6 (which is large), and for PVA with average molecular weight 50000, p=1140 and n=126 (which is also large). While glycerol monostearate has one point of attachment per molecule of glycerol monostearate, n for poly[(vinyl alcohol)-(stearic acid)] can be many values which are dependent upon the average molecular weight of PVA that is used, including less than 1, 1 or more, 2 or more, 3 or more, 4 or more, 5 or more, 6 or more, 7 or more, 8 or more, 9 or more, 10 or more, 11-20, 20 or more, 20-25, 26-30, 31-40, 41-50, 50 or more, 100 or more, etc. The large n that is possible with poly[(vinyl alcohol)-(stearic acid)] establishes an extremely large activation energy to remove all of the stearate hydrophobic groups from the hydrophobic fiber, resulting in an extremely durable hydrophilic surface on it. Those ordinarily skilled in the art can see that there are many equivalents to glycerol monostearate and poly[(vinyl alcohol)-(stearic acid)], where different hydrophilic groups are substituted for glycerol and PVA and different hydrophobic groups are substituted for stearate or stearic acid.

During manufacture using the co-extrusion and multiplication method, the effect of the amphiphilic molecules on the viscosity of the polymer melt are determined so that the proper conditions for the co-extrusion can be set before producing the semipermeable liner sections of the algae cultivation system. Once settings for generating pore size gradients and fibers with surface modified hydrophilicity are established, the two techniques can be combined to generate semipermeable liner sections having both pore size gradients and modified surfaces to simultaneously minimize particle clogging and fouling by hydrophobic molecules.

In nonlimiting embodiments, semipermeable liner sections that are manufactured with pore size gradients with the smallest pores in the interior and at least one hydrophobic fiber with its surface treated with a durable amphiphilic molecule will have the benefits of inherently low costs from using low cost constituent hydrophobic fibers like PE and being resistant to clogging by particles and fouling by hydrophobic molecules present in cultures. The durability of the hydrophilic coating on the surface of the hydrophobic fiber will be enhanced by using an amphiphilic molecule with n hydrophobic groups, where n is large, such as poly[(vinyl alcohol)-(stearic acid)].

Although the modifications of introducing the pore size gradient and the durable hydrophilic surface on a hydrophobic fiber have been described in the context of manufacturing the semipermeable liner sections using the forced assembly co-extrusion and two-dimensional multiplication technique, both modifications are compatible with other membrane manufacturing techniques like electrospinning, rotary jet spinning, melt blowing, and other techniques. Pore size gradients using these techniques can be generated by producing thin tapes or layers with a specified fiber diameter and then sandwiching the thin tapes together such that the layers are ordered with a continuous gradient of fiber diameters. Likewise, the fibers generated with these manufacturing techniques can employ mixtures of hydrophobic polymers and amphiphilic molecules as described in this disclosure.

The design of OAACS to exploit strong unidirectional winds to generate a rapid unidirectional longitudinal flow of the culture within the system creates additional opportunities to exploit spatially arranged elements in OAACS to provide utility not possible with other cultivation systems. For example, locating nutrient impermeable liner section(s) at and downstream from interior transverse member(s) enables addition of nutrients at interior transverse member(s) and prevention of their significant loss to the surrounding water as they flow downstream.

OAACS is designed for long term operations extending for many years. Combining elements to decrease the rates of both clogging and fouling of disclosed semipermeable liner sections is crucial for maintaining durably high DIC transfer rates from the surrounding water through the semipermeable liner sections into the culture and keeping operating costs low.

In a nonlimiting embodiment, DIC mass transfer rates across semipermeable liner sections under conditions that simulate what will be experienced in the field in pilot and large-scale OAACS installations can be tested with the PBR shown in FIG. 3. The system is operated at Reynolds (Re) numbers sufficient to induce turbulent flow in the culture and surrounding water chambers, 110 and 120, respectively, in order to simulate the OAACS turbulent flow conditions that are present due to strong winds and currents. Based upon wind speeds of 5-15 m/s, the unidirectional (longitudinal) mean velocity of the culture in OAACS is about 30 cm/s. Acceptable diameters for the PBR growth tube are determined based upon the desire to simulate turbulent flow conditions at this flow rate. This happens when Re>4000. Accordingly, as a nonlimiting example, if 1.27 cm diameter tubing is used for the transparent tubing, a Re>4000 occurs when the average flow velocity is ≥32 cm/s. Therefore, using tubing approximately 1.27 cm diameter or larger with average flow velocities at approximately 32 cm/s or greater is acceptable.

Using methods familiar to those with ordinary skill in the art, the semipermeable liner sections' dynamic DIC mass transfer characteristics are determined in a nonlimiting way once semipermeable liner sections are fitted and sealed into the PBRs. As a nonlimiting example, the culture chamber 110 and culture reservoir are filled with water and the surrounding water chamber 120 and surrounding water reservoir are filled with a solution mimicking the DIC in ocean water (about 2.5 mM). The system is operated with flow velocities sufficient for turbulent flow as described above, and samples from each reservoir are taken over time. Testing the samples for pH and total alkalinity allows calculation of the semipermeable liner sections' permeabilities based on a model of the mass transfer taking place in the apparatus, as is familiar to those ordinarily skilled in the art.

The long-term performance of the semipermeable liner sections during continuous growth of cultures can be tested in a nonlimiting way in the PBRs under conditions that simulate those expected in the field at large scale using OAACS. A nonlimiting example of medium that can be used to simulate ocean water is YBCIII (Chen, Zehr, and Mellon 1996), and YBCIII supplemented with varying amounts of key nutrients like extra iron, and/or nitrogen, and/or phosphate can be used for the growth media for the cultures (listed as mYBCIII below). The alkalinity and pH of the YBCIII in the surrounding water reservoir are controlled as described below, and mass transfer across the semipermeable liner section from the surrounding water side to the culture side maintains a healthy non-$CO_2$ limited growth environment in the culture. The surrounding water reservoir is sparged with air and controlled amounts of $CO_2$ are sparged to maintain pH=8.10-8.30. Alkalinity levels in the surrounding water reservoir are also determined and adjusted as needed. The culture reservoir is sampled regularly and measurements of DIC, pH, iron, nitrogen, phosphate, culture density, etc. are measured. Limiting nutrients like iron, and/or nitrogen, and/or phosphate are added directly to the culture reservoir to simulate additions of them at interior transverse members in the large-scale OAACS systems. Once high cell densities are reached, harvest of culture is regularly taken from the culture reservoir and make up mYBCIII or equivalent is added. Harvests and additions frequencies are adjusted as appropriate.

The disclosed semipermeable liner sections are inspected and characterized after use or when PBR performance declines. The effects of the pore structure and fiber surface hydrophilicity on the observed degrees of clogging and fouling are determined. The used semipermeable liner sections are tested for DIC transfer rates as described above and they can also undergo SEM analysis, if deemed appropriate, to look at effects of the culture conditions on the pore architecture.

The semipermeable liner sections disclosed herein and manufactured for OAACS can be used for other applications. The properties that make the semipermeable liner sections practical for use with OAACS are also useful for other nonlimiting applications like microfiltration, including tangential flow filtration, use in membrane photobioreactors for wastewater treatment, dead-end filtration, and other applications like wound dressings, battery separators, and providing a scaffold in the replacement and regeneration of biological tissues.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

The invention claimed is:

1. A floating generally rectangular algae cultivation system with a length, a width, and ends designed for flotation and positioning on the surface of a body of water and wherein the positioning is for creation of a unidirectional longitudinal wind driven surface current of an algae culture within the system comprising:

a) a buoyant framework arranged into longitudinal members along the entire length and transverse members along the entire width with a set of two longitudinal and two transverse members forming all four of the ends and at least one interior transverse member, wherein the longitudinal and transverse members comprise pipes that are conduits for a plurality of process fluids selected from the group comprising nutrient feeds, culture, and surrounding water;

b) an algae impermeable liner comprising at least three sections, wherein each section is attached to the longitudinal members and adjacent sections are attached either to each other or to an interior transverse member, wherein the buoyant framework and the algae impermeable liner create a containment structure and the at least three sections comprise;

i. at least two semipermeable liner sections having two planar surfaces, an interior, and pores through the interior, wherein the semipermeable liner sections are permeable to dissolved inorganic carbon; and ii. at least one nutrient impermeable liner section that is impermeable to nutrients added to the system;

wherein the at least three sections are arranged consecutively from upstream to downstream such that one semipermeable liner section starts upstream of the at least one interior transverse member and continues downstream to it; one nutrient impermeable liner section starts at the at least one interior member and continues downstream from it, and one semipermeable liner section starts at the downstream end of the one nutrient impermeable liner section and continues downstream from it;

c) a mooring system; and d) at least one of culture harvesting and nutrient replenishment systems positioned at each of the two transverse members forming two of the ends and the at least one interior transverse member.

2. The algae cultivation system according to claim 1 wherein the mooring system comprises a mooring line.

3. The algae cultivation system according to claim 1 wherein the mooring system comprises a buoy system.

4. The algae cultivation system according to claim 1 wherein the buoyant framework comprises at least one bundle of at least two tubes.

5. The algae cultivation system according to claim 1 wherein at least one of the longitudinal members connects to at least one of a ship, platform, buoy, tank, or a piping network.

6. The algae cultivation system according to claim 1 wherein the nutrient feeds include at least one selected from the group consisting of nitrogen, iron, and phosphorous.

7. The algae cultivation system according to claim 1 wherein the interior transverse member further comprises at least one platform.

8. The algae cultivation system according to claim 7 wherein the at least one platform comprises at least one platform support that floats in the culture and is arranged to form lengthwise channels together with the algae impermeable liner.

9. The algae cultivation system according to claim 1 wherein the system is more than 1 kilometer long and more than 100 meters wide.

10. The algae cultivation system according to claim 1 which further comprises a submersion system for lowering the cultivation system below the surface of the body of water.

11. The algae cultivation system according to claim 10 wherein the longitudinal members comprise at least one bundle of at least two pipes and at least one of the pipes is a ballast tube.

12. The algae cultivation system according to claim 11 wherein the submersion system comprises systems to change the buoyancy of the ballast tube.

13. The algae cultivation system according to claim 10 which further comprises a depth pressure sensor for controlling the depth of submersion of the algae cultivation system.

14. The algae cultivation system according to claim 10 wherein the submersion system comprises a winch system.

15. The algae cultivation system according to claim 14 wherein the winch system comprises a free hanging submerging line that extends to a subsurface.

16. The algae cultivation system according to claim 1 wherein there are at least two algae cultivation systems.

17. The algae cultivation system according to claim 1 wherein the cultivation system further comprises the process fluids.

18. The algae cultivation system according to claim 17 wherein the process fluids comprise a culture in the containment structure.

19. The algae cultivation system according to claim 1 wherein the semipermeable liner section comprises fibers.

20. The algae cultivation system according to claim 19 wherein the fibers comprise at least one hydrophobic polymer.

21. The algae cultivation system according to claim 20 wherein the fibers further comprise an amphiphilic molecule.

22. The algae cultivation system according to claim 21 wherein the amphiphilic molecule is glycerol monostearate.

23. The algae cultivation system according to claim 21 wherein the amphiphilic molecule has an average of n hydrophobic groups, wherein n is large.

24. The algae cultivation system according to claim 23 wherein the amphiphilic molecule is poly[(vinyl alcohol)-(stearic acid)].

25. The algae cultivation system according to claim 1 wherein the semipermeable liner section comprises a gradient of pore sizes with the largest pores on the surfaces of the liner and the smallest pores in the interior of the liner.

* * * * *